No. 792,477. PATENTED JUNE 13, 1905.
E. J. SWEDLUND.
TRANSMISSION GEAR.
APPLICATION FILED AUG. 11, 1903.

2 SHEETS—SHEET 1.

WITNESSES
A. K. Appleman
W. Harrison

INVENTOR
Erick J. Swedlund
BY
Munn
ATTORNEYS

No. 792,477. PATENTED JUNE 13, 1905.
E. J. SWEDLUND.
TRANSMISSION GEAR.
APPLICATION FILED AUG. 11, 1903.

2 SHEETS—SHEET 2.

WITNESSES:
A. R. Appleman
W. Harrison.

INVENTOR
Erick J. Swedlund
BY
Munn
ATTORNEYS

No. 792,477. Patented June 13, 1905.

UNITED STATES PATENT OFFICE.

ERICK J. SWEDLUND, OF ATWATER, MINNESOTA.

TRANSMISSION-GEAR.

SPECIFICATION forming part of Letters Patent No. 792,477, dated June 13, 1905.

Application filed August 11, 1903. Serial No. 169,119.

*To all whom it may concern:*

Be it known that I, ERICK J. SWEDLUND, a citizen of the United States, and a resident of Atwater, in the county of Kandiyohi and State of Minnesota, have invented a new and Improved Transmission-Gear, of which the following is a full, clear, and exact description.

My invention relates to transmission-gears suitable for general use and particularly in connection with automobiles and other vehicles and with machinery in which power is to be transmitted from one shaft to another.

Reference is to be had to the accompanying drawings, forming a part of this specification, in which similar characters of reference indicate corresponding parts in all the figures.

Figure 1:
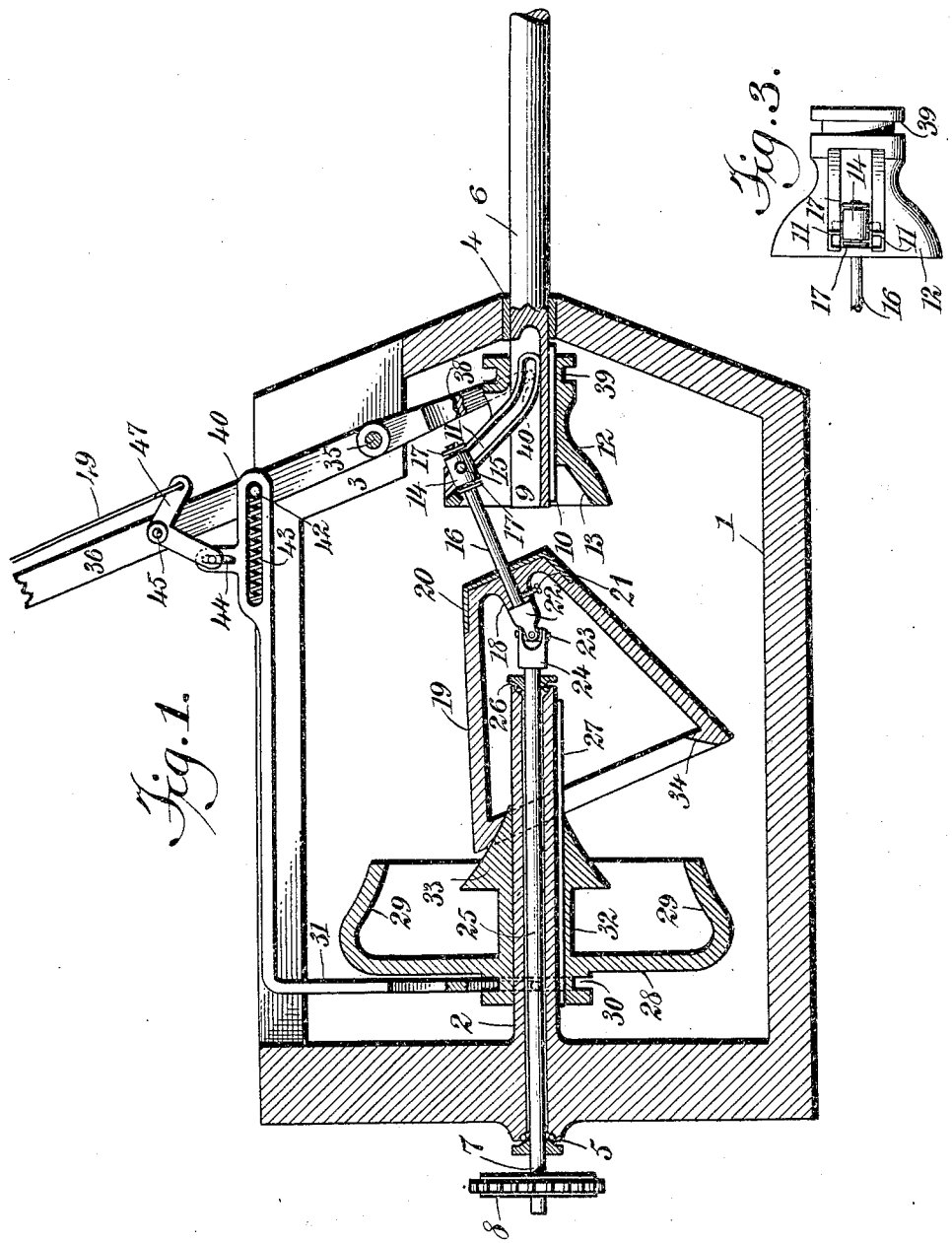
Figure 2:
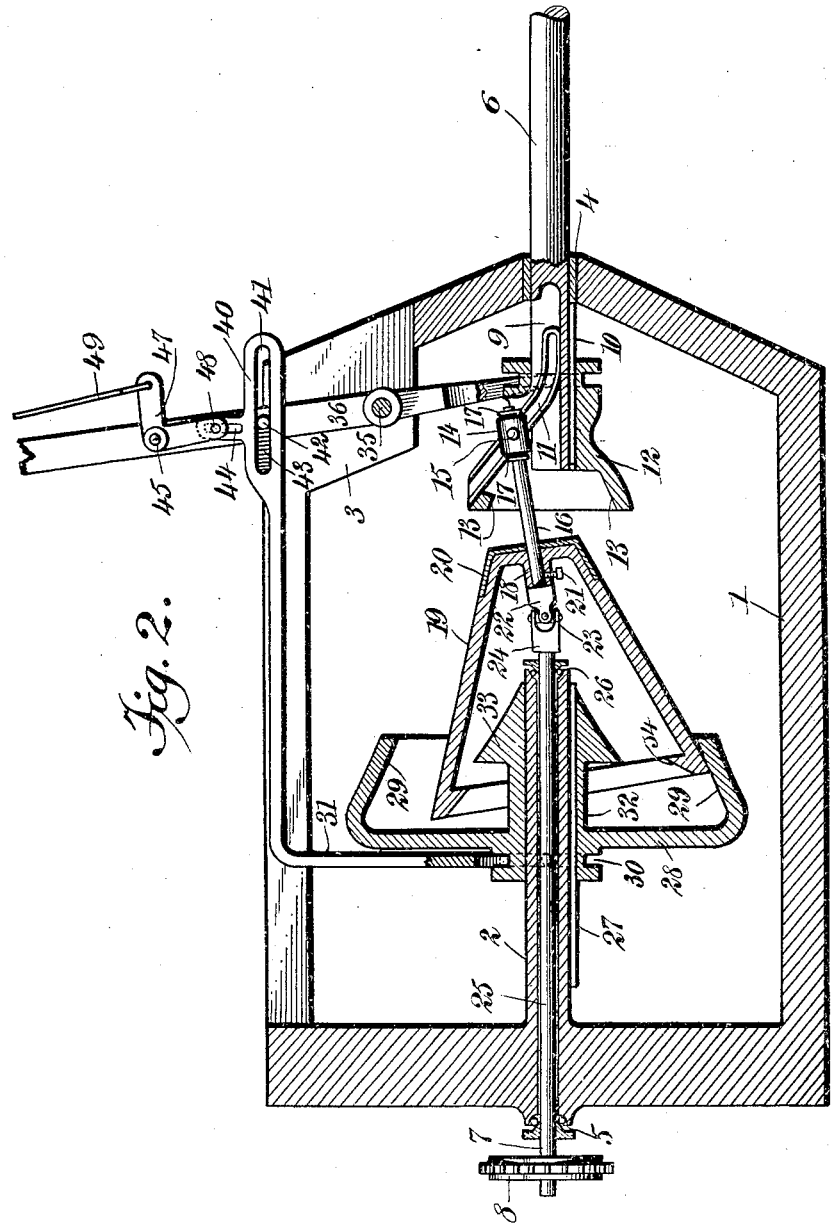

Figure 1 is a vertical longitudinal section showing the driving and driven shafts moving in the same direction. Fig. 2 is a somewhat similar view, but showing the driving and driven shafts moving in the opposite direction; and Fig. 3 is a fragmentary plan view of the cam mechanism for changing the speed.

A casing 1 is provided with a hollow stem 2, a lug 3, and with bearings 4 5. A driving-shaft is shown at 6, a driven shaft at 7, and a pulley at 8, whereby the power is transmitted from the driven shaft. The driving-shaft 6 is provided with a slot 9 and with a feather 10. Within a head 12 of the shape shown is mounted a cam-track 11, which rotates therewith. The inner surface 13 of the head 12 is a friction bearing-surface. A bearing-sleeve 14 is provided with trunnions 15, which loosely engage the cam-track 11. Revolubly connected with the bearing-sleeve 14 is a shaft 16, provided with collars 17, this shaft being free to rotate relatively to the bearing-sleeve 14, but having little or no longitudinal movement through the bearing-sleeve 14. A bell-shaped pulley 19 is provided with a bearing-surface 20, preferably of leather or rubber. This bell-shaped member is provided with a hollow boss 18, in which is rigidly secured the revoluble shaft 16 by means of a bolt 21. The shaft 16 is also connected rigidly with a member 22 of the universal joint 23, the other member 24 of which is rigidly connected with the driven shaft 25. A ball-bearing 26 supports the inner end of the driven shaft.

Rigidly mounted upon the hollow stem 2 within the casing 1 is a feather 27, and upon the said stem 2 is a female pulley 28 of the shape shown, this pulley being free to slide longitudinally upon the stem 2, but being unable to rotate because of the feather 27. The female pulley 28 is provided with a bearing-surface 29, which may be engaged by the exterior surface of the bell-shaped pulley 19. The female pulley 28 is further provided with a neck 30, which is engaged by an L-shaped shifter 31, whereby the female pulley may be moved longitudinally with reference to the stem 2. The shifter 31 is provided with a head 40, this head having a longitudinal slot 41 for engaging a pin 42 upon a lever 36, pivoted at 35 on the casing 1. A spring 43, inclosed in the slot 41, engages the pin 42, thereby normally pressing the shifter 31 and the lever 36 in opposite directions. A link 44 is integrally connected with the head 40, and upon a pin 45, fixed in the lever 36, is a bell-crank 47, provided with a pin 48, which engages the link 44. A rod 49 connects with the outer end of the bell-crank 47, whereby the latter may be manipulated. Integrally connected with the female pulley 28 is a stem 32, provided with a conical head 33, the outer or conical surface of which is adapted to engage the inner bearing-surface 34 of the bell-shaped member 19.

The operation of my device is as follows: The lever 36 is used for varying the speed, which can be slowed down to such an extent that the driven shaft has no motion whatever. The rod 49 can thereupon be used for reversing the motion of the driven shaft. The driving-shaft 6 being in motion, suppose that the inner bearing-surface 34 of the bell-shaped pulley 19 rests upon the smaller end of the conical head 33. The shaft 16 being free to turn relatively to the bearing-sleeve 14 merely describes a cone of revolutions around the general axis of the driving and driven shafts, but without necessarily rotating relatively to the sleeve 14. In other words, the shaft 16 revolves bodily upon the principle of a crank. In performing this movement the bell-shaped pulley 19, by virtue of its frictional contact upon the cone 33, acquires a gyratory movement in the same direction as that of the driven shaft—that is to say, the bell-shaped member 19 gyrates or wabbles around with the same sort of oscillatory motion—which will be understood from Fig. 1, and at the same time acquires a rotary motion, owing to the difference in circumference between the inner bearing-surface 34 of the bell-shaped pulley and the outer bearing-surface 33 of the cone. The result is that the rotary movement of the pulley 19 relatively to the stem 2 and feather 27 is considerably slower than the rotary movement of the driving-shaft 6, whereas its number of wabbles or oscillations is the same as the number of the revolutions of the shaft 6. The bell-shaped member 19, acquiring by virtue of its contact with the cone 33 a comparatively slow rotary motion, as stated, confers this rotary motion upon the shaft 16, causing this shaft to rotate relatively to the bearing-sleeve 14 and by virtue of the universal joint 23 causing the driven shaft 25 to rotate at the same speed as the bell-shaped member 19, the motion thus referred to in the bell-shaped member having its rotation relatively to its own axis and in its motion in swinging, oscillating, or wabbling around the stem 2. If now the lever 36 be moved to the right from its position indicated in Fig. 1, so that the surface 34 of the bell-shaped pulley travels upon a portion of greater diameter of the cone 33, the motion conferred upon the driven shaft is rendered slower than before, because the bell-shaped member 34 is now contacting with a part of the cone 33 of greater diameter—that is to say, as the surface 34 is moved from the small end to the large end of the cone 33 the motion conferred by the driving-shaft 6 upon the driven shaft 7 is rendered slower, and this effect may be increased until the bearing-surface 34 is unable to engage the largest portion of the cone 33. With the parts in the position just described the shaft 6 is of course unable to confer any motion upon the driven shaft 7. The lever 36 being moved to its extreme right causes the bearing-surface 20 of the bell-shaped member 19 to tightly engage the bearing-surface 13 of the pulley 12, thereby locking these two members together, so that they virtually form a type of clutch. The speed of the driving-shaft 6 is then, of course, necessarily the same as that of the driven shaft 7. If the lever 36 be placed in the position indicated in Fig. 2, the rod 49 can be so manipulated that the bell-shaped member 19 is engaged by the mouth of the female pulley 29. The shaft 6 being rotated causes the outer surface of the bell-shaped member 19 to roll or wabble around the interior surface 29 of the female member 28, thereby causing the driven shaft 7 to rotate in the opposite direction. The motion is progressive, the most extreme movement of the pulley 12 to the right and pulley 28 to the left being such as to give the greatest speed to the driven shaft 7. The bell-shaped pulley has no longitudinal or axial motion. It will be seen that from the position of the greatest speed just described the pulleys 12 and 28 may be moved gradually by the lever 36, so as to first disengage the female pulley 28 and then engage the conical head 33, the motion of the driven shaft 7 gradually slowing up as compared with that of the driving-shaft 6. Upon reaching the extreme limit to the left the bearing-surface 13 of the pulley 12 is forcibly pressed upon by the surface 20 of the bell-shaped member 19, thereby locking the bell-shaped member rigidly in position, so that the driven shaft 7 has the same motion as the driving-shaft 6. In other words, the driven shaft may be given any desired degree of speed and the direction of movement may be reversed relatively to that of the driving-shaft.

It will be understood that the mechanism is reversible, like almost any other gearing, and that the shaft 7 may be operated as a driving-shaft and the shaft 6 as a driven shaft; also, that all of the movements described are relative and that the invention may be employed in a diversity of relations wherein motions are to be translated from one point to another.

Having thus described my invention, I claim as new and desire to secure by Letters Patent—

1. In a power-transmitting gear, the combination of a revoluble shaft, a revoluble head mounted thereon and provided with a slideway, a bearing-sleeve provided with trunnions and mounted within said slideway, a shaft connected with said bearing-sleeve and free to rotate axially, a female pulley mounted upon said shaft, a stationary member for engaging said female pulley, and a revoluble member connected with said shaft for the transmission of power thereto or therefrom.

2. In a power-transmitting gear, the combination of a frame, a driven shaft mounted therein, a conical member movable back and forth relatively to said frame but not free to rotate, a female member rigidly connected with said conical member, a substantially bell-shaped pulley provided with bearing-surfaces adapted to engage said female member and said conical member, a shaft connected with said bell-shaped member and revoluble therewith, means for causing said shaft to swing bodily, and a driven shaft connected with said substantially bell-shaped member.

3. In a power-transmitting gear, the combination of a driving-shaft, a driven shaft, reversible friction-gearing connected with said driving and said driven shafts and adapted to reverse the motion of said driven shaft, and mechanism for connecting said friction-gearing, said driving-shaft and said driven shaft together so that all of said parts can be moved together as a whole.

4. In a power-transmitting gear, the combination of a gear member free to rotate upon its own axis and also to gyrate, said gear member having a contact-surface, a non-revoluble member provided with a contact-surface of substantially conical shape engaged by said contact-surface of said gear member, means for shifting the general position of said non-revoluble member relatively to said gear member, and mechanism connected with said gear member for transmitting power to or from the same.

5. In a power-transmitting gear, the combination of a hollow gear member free to rotate upon its own axis and also to gyrate, said gear member having an internal contact-surface, a member having an external contact-surface engaged by said internal contact-surface of said hollow gear member, thereby causing said hollow gear member to rotate as aforesaid upon its own axis, a shaft connected with said hollow gear member for transmitting power to or from the same, and another shaft connected with said hollow gear member and having a rotary movement corresponding to the gyratory movement thereof.

6. In a power-transmitting gear, the combination of a gear member free to rotate upon its own axis and also to gyrate, said gear member having a bearing-surface, a member engaged by said gear member and provided with a bearing-surface engaging said bearing-surface of said gear member, whereby the latter is caused to rotate upon its own axis, means for causing said gear member to gyrate, and a revoluble shaft connected with said gear member by a universal joint.

7. In a power-transmitting gear, the combination of a hollow gear member provided with an inner bearing-surface and an outer bearing-surface, means for actuating said gear member so as to cause the same to gyrate, and mechanism provided with separate bearing-surfaces to be engaged by said inner and said outer bearing-surfaces respectively for the purpose of causing said gear member to rotate in opposite directions, and mechanism connected with said gear member for transmitting power thereto or therefrom.

8. In a power-transmitting gear, the combination of a gear member provided with a plurality of bearing-surfaces, means for causing said gear member to gyrate, a member provided with a plurality of bearing-surfaces for engaging said bearing-surfaces of said gear member, and lever mechanism controllable at will for bodily shifting the position of said member provided with said plurality of bearing-surfaces.

9. In a power-transmitting gear, the combination of a bell-shaped member provided exteriorly with a substantially conical bearing-surface, a substantially conical member larger than said bell-shaped member and provided interiorly with a bearing-surface of greater diameter than said bearing-surface of said bell-shaped member, so that said bell-shaped member is free to rotate at different relative speeds relatively to said substantially conical member, and means for shifting one of said members relatively to the other, for the purpose of varying the speed thereof.

10. In a power-transmitting gear, the combination of a driving member and a driven member connected in operative engagement with each other by means of changeable-diameter contact-surfaces, one of said members having a gyratory movement and also a rotary movement, the other of said members being acted upon in response to said gyratory movement, and means for shifting one of said members bodily in relation to the other.

11. In a power-transmitting gear, the combination of a gear member free to rotate upon its own axis and also to gyrate, said gear member having a contact-surface, a non-revoluble member provided with a contact-surface of substantially conical shape engaged by said contact-surface of said gear member, means for bodily shifting the position of said non-revoluble member relatively to said gear member, and mechanism connected with said gear member for transmitting power to or from the same.

12. In a power-transmitting gear, the combination of a gear member, means for actuating said gear member so as to cause the same to gyrate, mechanism engaged by said gear member in its gyrations for the purpose of causing said gear member to rotate upon its own axis at a speed independent of said gyrations, rotary mechanism connected with said gear member and having a positive motion in accordance with the rotation thereof, and mechanism controllable at will for shifting the position of said gear member relatively to said mechanism engaged thereby, for the purpose of varying the relative speed therebetween.

13. In a power-transmitting gear, the combination of a gear member free to rotate upon its own axis and also to gyrate, a member having a contact-surface engaged by that of said gear member and adapted to coact therewith for changing the speed thereof, according to the position of said gear member and said member engaged thereby relatively to each other, a revoluble head disposed adjacent to said gear member, a shaft loosely connecting said revoluble head with said gear member, and means for shifting the position of said gear member relatively to said member engaged thereby and of said head relatively to said shaft.

14. In a power-transmitting gear, the combination of a gear member free to rotate upon its own axis and also to gyrate, said gear member having a contact-surface, a second member having a contact-surface engaged by that of said gear member and adapted to coact therewith for changing the speed thereof according to the positions of said gear member and said second member relatively to each other, means for transmitting power to or from said gear member, and mechanism for controlling the positions of said gear member and said second member relatively to each other.

15. In a power-transmitting gear, the combination of a gear member free to rotate upon its own axis and also to gyrate, said gear member having a contact-surface, a second member having a contact-surface engaged by said contact-surface of said gear member and adapted to coact therewith for changing the speed thereof according to the positions of said gear member and said second member relatively to each other, means for transmitting power to or from said gear member, and mechanism controllable at will for shifting said gear member bodily in relation to said second member.

16. In a power-transmitting gear, the combination of a gear member free to rotate upon its own axis and also to gyrate, said gear member having a contact-surface, a second member having a contact-surface engaged by said contact-surface of said gear member and adapted to coact therewith for changing the speed thereof according to the positions of said gear member and said second member relatively to each other, means for transmitting power to or from said gear member, and shifting mechanism connected with both said gear member and with said second member and controllable at will for shifting the same relatively to each other.

17. In a power-transmitting gear, the combination of a gear member free to rotate upon its own axis and also to gyrate, said gear member having a contact-surface, a second member having a contact-surface engaged by said contact-surface of said gear member, thereby causing said gear member to rotate as aforesaid upon its own axis, a shaft connected with said gear member for transmitting power to or from the same, and another shaft connected with said last-mentioned shaft and having a rotary movement corresponding to the gyratory movement of said gear member.

18. The combination with driving and driven bodies, of variable-speed gearing interposed between them, having engaging members, one of which rolls upon the other and is operatively connected with both of said bodies, the members being adjustable one with relation to the other to gradually change the relative diameters of their engaging surfaces.

19. The combination with driving and driven bodies, of variable-speed gearing interposed between them having engaging members, one of which moves as a planet-wheel rolling against the other, the members being adjustable one with relation to the other to gradually change the relative diameters of their engaging surfaces.

20. In a variable-speed gearing, the combination of a ring forming one of a pair of engaging members, a rotary wheel having an eccentrically-moving axis within the said ring and forming the other engaging member, the engaging face of one member being conoidal and longer than the engaging part of the other member, and means for moving one of said members longitudinally with relation to the other while maintaining them in driving engagement.

21. In a variable-speed gearing, the combination of a ring forming one of a pair of engaging members and having an internal frustoconical engaging face, a rotary wheel having an eccentrically-moving axis within the said ring and forming the other engaging member, and means for moving one of said members longitudinally with relation to the other, while maintaining them in driving engagement.

22. In a variable-speed gearing, the combination of a rotary shaft, engaging members comprising a ring and a wheel eccentrically and rotatably mounted on said shaft within the ring, one of said members having a conoidal engaging surface longer than the engaging part of the other member, means for moving one of said members longitudinally with relation to the other while maintaining their engagement, and a second shaft operatively connected with said wheel.

23. The combination with driving and driven shafts, a variable-speed gearing having an eccentric-wheel operatively connected with one of said shafts and mounted on the other of said shafts to rotate independently thereon and forming one of a pair of engaging members, a ring about said wheel forming the other engaging member, the engaging face of one member being conoidal and longer than the engaging part of the other member, and means for shifting one of said members longitudinally of the other while maintaining the engagement between them.

In testimony whereof I have signed my name to this specification in the presence of two subscribing witnesses.

ERICK J. SWEDLUND.

Witnesses:
 WM. PETERSON,
 S. E. PETERSON.